(12) United States Patent
Tanabe et al.

(10) Patent No.: US 8,423,021 B2
(45) Date of Patent: Apr. 16, 2013

(54) LOCATION REGISTRATION METHOD, MOBILE COMMUNICATION SYSTEM AND RADIO BASE STATION

(75) Inventors: Akimichi Tanabe, Kawasaki (JP); Kazuyuki Kozu, Yokohama (JP); Kazunori Obata, Yokosuka (JP); Tadashi Uchiyama, Miura (JP)

(73) Assignee: NTT DoCoMo, Inc., Tokyo (JP)

( * ) Notice: Subject to any disclaimer, the term of this patent is extended or adjusted under 35 U.S.C. 154(b) by 66 days.

(21) Appl. No.: 12/866,252

(22) PCT Filed: Feb. 3, 2009

(86) PCT No.: PCT/JP2009/051789
§ 371 (c)(1),
(2), (4) Date: Oct. 26, 2010

(87) PCT Pub. No.: WO2009/099064
PCT Pub. Date: Aug. 13, 2009

(65) Prior Publication Data
US 2011/0053593 A1 Mar. 3, 2011

(30) Foreign Application Priority Data
Feb. 5, 2008 (JP) ................... 2008-025610

(51) Int. Cl.
*G06F 15/16* (2006.01)
(52) U.S. Cl.
USPC ................... 455/435.1; 455/456.1

(58) Field of Classification Search ............... 455/414.1, 455/414.2, 432.1, 456.1, 456.2, 435.1
See application file for complete search history.

(56) References Cited

U.S. PATENT DOCUMENTS
2007/0226779 A1* 9/2007 Yokomitsu et al. ............... 726/2

FOREIGN PATENT DOCUMENTS
JP 2002-330464 A 11/2002

OTHER PUBLICATIONS
International Search Report w/translation from PCT/JP2009/051789 dated Apr. 7, 2009 (3 pages).
Written Opinion from PCT/JP2009/051789 dated Apr. 7, 2009 (3 pages).

(Continued)

*Primary Examiner* — Sam Bhattacharya
(74) *Attorney, Agent, or Firm* — Osha Liang LLP

(57) ABSTRACT

A location registration method according to the present invention, includes: transmitting, at a mobile station (UE), a TA signal, when detecting that the mobile station (UE) has moved out of a TA list with which the mobile station (UE) is already registered by location registration processing; and transferring, from a radio base station (eNB) to an exchange (MME) identified by an exchange ID included in the TAU signal. An exchange ID assigned to a mobile station (#a) belonging to a first layer is different from an exchange ID assigned to a mobile station (#b) belonging to a second layer, even though the same exchange is identified by the exchange IDs. A TA list and a pool area set for the mobile station (#a) is different from a TA list and a pool area set for the mobile station (#b).

9 Claims, 9 Drawing Sheets

OTHER PUBLICATIONS

3GPP TS 23.236 V7.0.0; "3rd Generation Partnership Project; Technical Specification Group Services and System Aspects; Intra-domain connection of Radio Access Network (RAN) nodes to multiple Core Network (CN) nodes"; Dec. 2006 (37 pages).

3GPP TS 23.401 V8.0.0; "3rd Generation Partnership Project; Technical Specification Group Services and System Aspects; General Packet Radio Services (GPRS) enhancements for Evolved Universal Terrestrial Radio Access Network (E-UTRAN) access"; Dec. 2007 (167 pages).

Extended European Search Report issued in EP 09 70 8141, mailing date Jul. 5, 2012 (11 pages).

3GPP RAN WG2 & RAN WG 3 & SA WG 2 meeting, SRJ-060021, "Idle Mode Handing for Intra and Inter System Mobility," SAMSUNG, Denver, Colorado, USA, Feb. 20-21, 2006 (7 pages).

3GPP TSG-RAN3#54, R3-061662, "Comparison of TA Concepts," NTT DOCOMO, Nov. 6-10, 2006, Riga, Latvia (3 pages).

3GPP TSG-SA2 Meeting #62, S2-080153, "GUTI and P-TMSI Handling to Solve Combined Node Issue," Huawei et al., Marina del Rey, USA, Jan. 14-18, 2008 (39 pages).

Office Action for Chinese Patent Application No. 200980104267.2 issued Aug. 31, 2012, with English translation thereof (10 pages).

* cited by examiner

S-TMSI

| MME COLOR CODE | M-TMSI |

| TRANSFER DESTINATION MME | MME COLOR CODE |
|---|---|
| MME#a | #0 |
| MME#a | #1 |
| MME#b | #2 |
| MME#b | #3 |
| ⋮ | ⋮ |

LOCATION REGISTRATION METHOD, MOBILE COMMUNICATION SYSTEM AND RADIO BASE STATION

TECHNICAL FIELD

The present invention relates to a location registration method, a mobile communication system, and a radio base station in which location registration processing is performed based on a location registration signal transmitted by a mobile station.

BACKGROUND ART

In a mobile communication system of the LTE (Long Term Evolution) type specified by the 3GPP, tracking area lists (hereinafter referred to as the TA list) have been considered to be managed by use of multiple layers in order to avoid a significant increase in location registration processing load at an exchange MME. Such an increase in processing load is caused by concurrent transmission of location registration (TAU: Tracking Area Update) signals in a case where a number of users of mobile stations are on the same train.

To be more specific, as shown in FIG. 1, such a mobile communication system is configured as follows. The mobile stations are divided into multiple layers so that tracking areas (hereinafter referred to as TAs) included in TA lists assigned to a mobile station #a belonging to a first layer are different from TAs included in TA lists assigned to a mobile station #b belonging to a second layer.

Here, each of the mobile stations #a and #b is configured to transmit a TAU signal, when detecting that the mobile station has moved out of TAs included in the TA list with which the mobile station is registered by location registration processing.

Therefore, even in such a case where users of the mobile stations #a and #b are on the same train as described above, timing for transmitting the TAU signal varies between the mobile stations belonging to the respective layers. Thus, a significant increase in location registration processing load at an exchange MME can be avoided.

However, in the existing LTE type mobile communication system, the TA list cannot be set to cover different pool areas controlled by the exchanges MME, respectively. Therefore, when mobile stations move between the pool areas, the TAU signals are transmitted all together at the same timing. This has resulted in a problem of significantly increasing the location registration processing load at the exchange MME.

To be more specific, as shown in FIG. 1, when the mobile stations #a and #b move beyond a boundary 1 between a pool area #1 and a pool area #2 or beyond a boundary 2 between the pool area #2 and a pool area #3, both of the mobile stations transmit the TAU signals at a timing T1 or T2. This causes a problem of leading to a situation where the location registration processing load at the exchange MME is significantly increased.

DISCLOSURE OF THE INVENTION

The present invention is made in consideration of the foregoing problem. An object of the present invention is to provide a location registration method, a mobile communication system and a radio base station, which are capable of avoiding a situation such as a significant increase in location registration processing load at an exchange MME, even when mobile stations move between pool areas.

A first aspect of the present invention is summarized as a location registration method of performing location registration processing on the basis of a location registration signal transmitted by a mobile station, the location registration method including the steps of: transmitting, at the mobile station, the location registration signal, when detecting that the mobile station has moved out of a location registration area with which the mobile station is already registered by location registration processing; and transferring, from a radio base station to an exchange identified by an exchange ID included in the location registration signal, the received location registration signal; wherein an exchange ID assigned to a mobile station belonging to a first layer is different from an exchange ID assigned to a mobile station belonging to a second layer, even though the same exchange is identified by the exchange IDs; a location registration area set for the mobile station belonging to the first layer is different from a location registration area set for the mobile station belonging to the second layer; a pool area controlled by one exchange is formed to include one or more entire location registration areas; and a pool area set for the mobile station belonging to the first layer is different from a pool area set for the mobile station belonging to the second layer.

In the first aspect of the present invention, when the radio base station fails to identify the exchange by the exchange ID included in the received location registration signal, the radio base station can transfer the location registration signal to a predetermined exchange.

In the first aspect of the present invention, the adjacent pool areas can overlap with each other.

In the first aspect of the present invention, the exchange ID can be for uniquely identifying the exchange only in each pool area; and the same exchange ID can not be used in each two adjacent pool areas.

A second aspect of the present invention is summarized as a mobile communication system configured to perform location registration processing on the basis of a location registration signal transmitted by a mobile station, wherein the mobile station is configured to transmit the location registration signal, when detecting that the mobile station has moved out of a location registration area with which the mobile station is already registered by location registration processing; a radio base station is configured to transfer the received location registration signal to an exchange identified by an exchange ID included in the location registration signal; an exchange ID assigned to a mobile station belonging to a first layer and an exchange ID assigned to a mobile station belonging to a second layer are different from each other, even though the same exchange is identified by the exchange IDs; a location registration area set for the mobile station belonging to the first layer and a location registration area set for the mobile station belonging to the second layer are different from each other; a pool area controlled by one exchange is formed to include one or more entire location registration areas; and a pool area set for the mobile station belonging to the first layer and a pool area set for the mobile station belonging to the second layer are different from each other.

In the second aspect of the present invention, when the radio base station fails to identify the exchange by the exchange ID included in the received location registration signal, the radio base station can be configured to transfer the location registration signal to a predetermined exchange.

In the second aspect of the present invention, the adjacent pool areas can overlap with each other.

In the second aspect of the present invention, the same exchange ID can not be used in each two adjacent pool areas.

A third aspect of the present invention is summarized as a radio base station used in the mobile communication system according to the above second aspect.

BEST MODE FOR CARRYING OUT THE INVENTION (Configuration of Mobile Communication System according to First Embodiment of Present Invention)

A description is given of a configuration of a mobile communication system according to a first embodiment of the present invention with reference to FIGS. 2 to 6.

In this embodiment, a description is given by taking the LTE type mobile communication system specified by the 3GPP as an example. However, the present invention is not limited to this example.

Moreover, in this embodiment a description is given by taking as an example the case where mobile stations are divided into two, first and second, layers for convenience. However, the present invention is also applicable to the case where mobile stations are divided into three or more layers.

Figure 1:
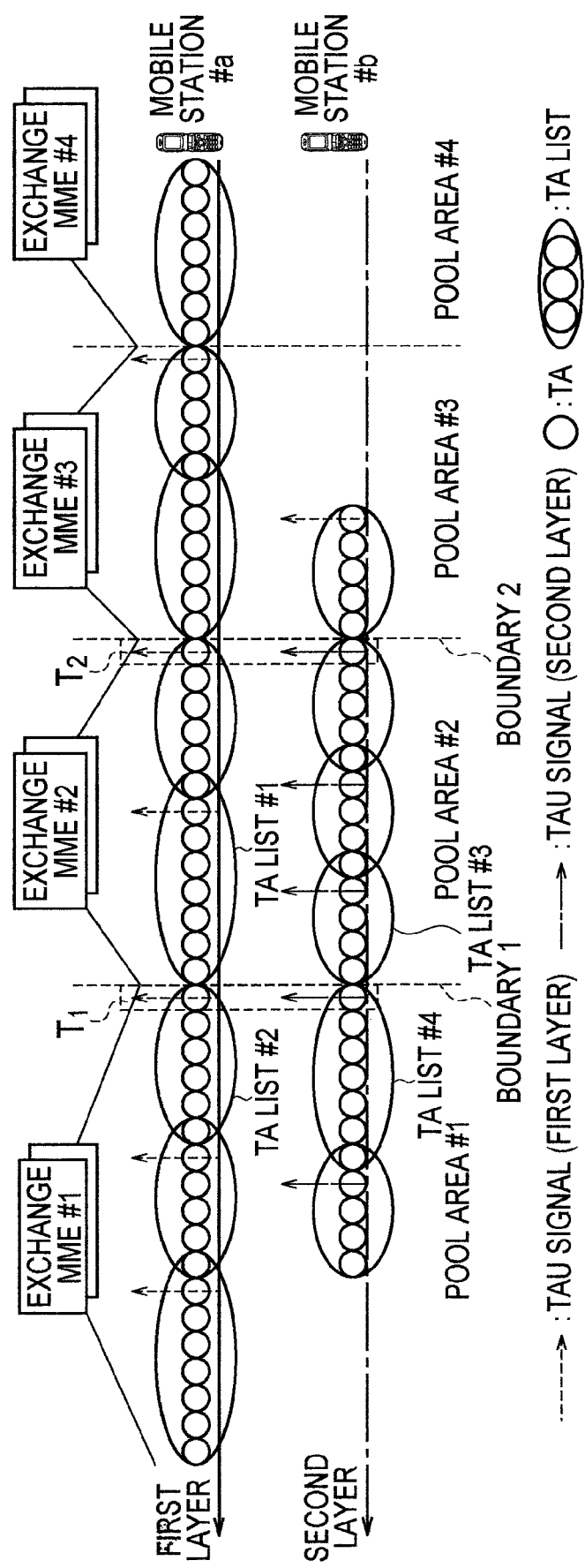
FIG. 1 is a diagram illustrating a problem of a conventional mobile communication system.
Figure 2:
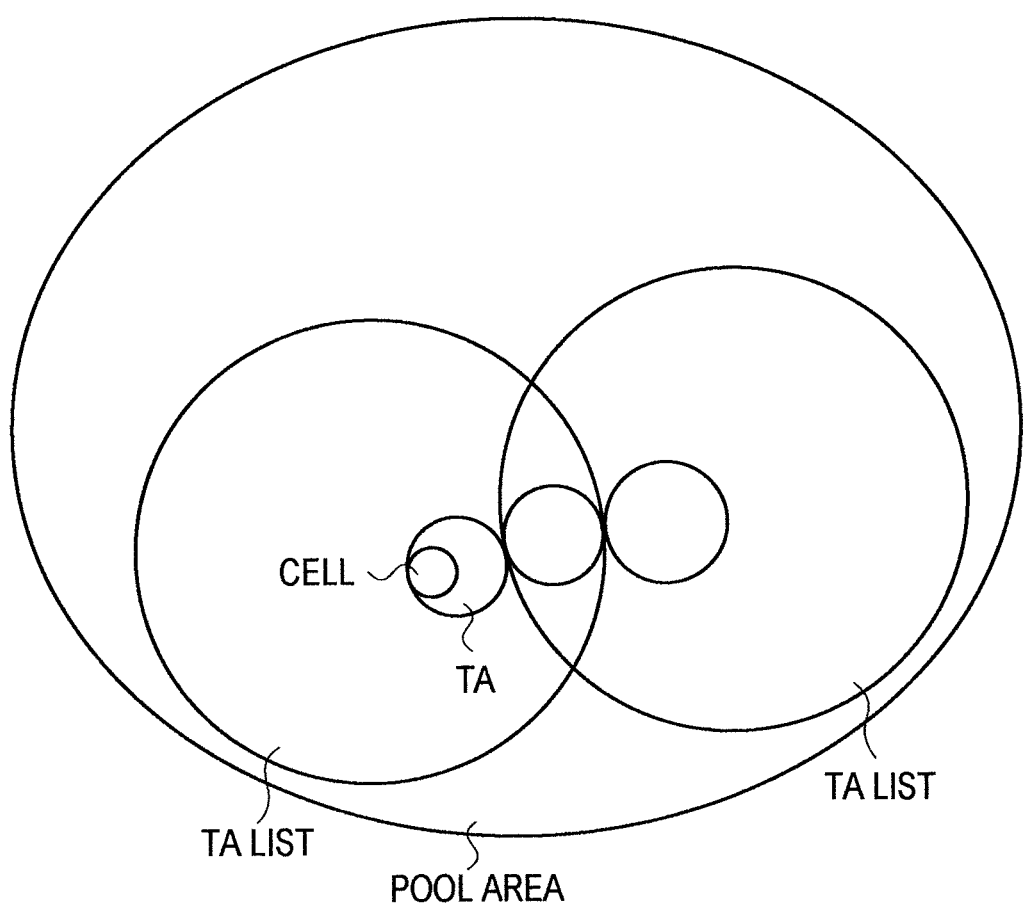
FIG. 2 is a diagram illustrating a relationship among a pool area, a TA list, a TA and a cell in a mobile communication system according to a first embodiment of the present invention.

FIG. 2 shows a relationship among a pool area, a TA list, a TA and a cell in the mobile communication system according to this embodiment.

As shown in FIG. 2, the pool area is an area controlled by one exchange MME and is formed to include one or more entire TA lists. Here, an MME color code (exchange ID) is for uniquely identifying the exchange MME within each pool area.

The TA list is a location registration area formed to include one or more entire TAs. The TA is formed to include one or more entire cells. Here, each radio base station eNB is configured to manage only one TA.

Each mobile station is configured to transmit a TAU signal (location registration signal) when detecting that the mobile station has moved out of a TA list (location registration area) with which the mobile station is registered by location registration processing.

Here, each mobile station is configured to determine whether or not TA (in which the mobile station is present) included in a broadcast signal from each radio base station eNB is included in the TA list with which the mobile station is registered by location registration processing. When it is determined that the TA list does not include the TA, The mobile station determines that the mobile station has moved out of the area of the TA list.

Note that each mobile station is configured to manage the TA included in the TA list with which the mobile station is registered by location registration processing in response to a notification from the exchange MME.

Figure 3:
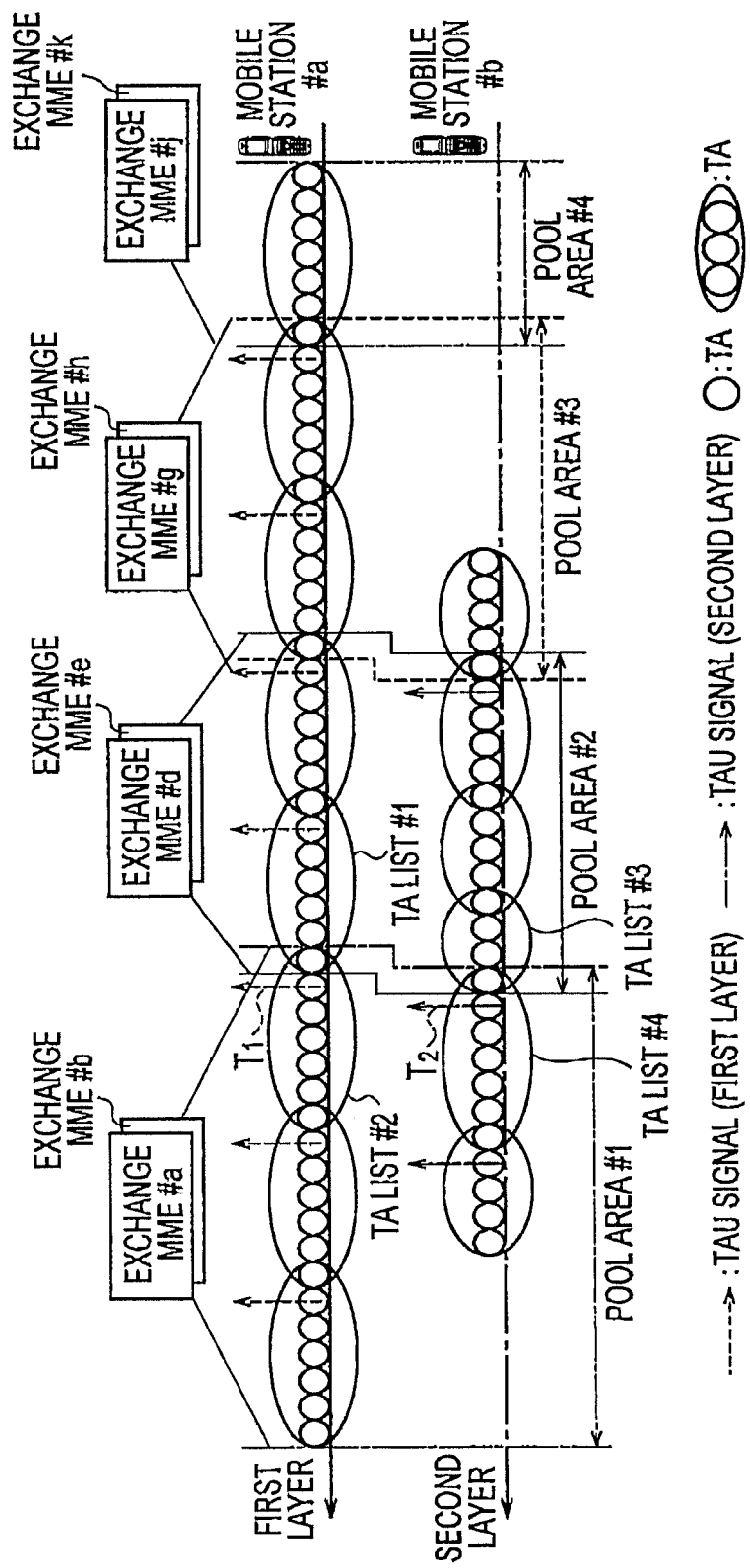
FIG. 3 is a diagram schematically illustrating the mobile communication system according to the first embodiment of the present invention.

In an example of FIG. 3, a mobile station #a belonging to a first layer is configured to transmit a TAU signal at timing T1 when detecting that the mobile station #a has moved out of the area of a TA list #1 with which the mobile station is registered by the location registration processing, i.e. when detecting that the mobile station #a has moved out of a pool area #2 including the TA list #1 with which the mobile station is registered by location registration processing.

Whereas, a mobile station #b belonging to a second layer is configured to transmit a TAU signal at timing T2 when detecting that the mobile station #b has moved out of the area of a TA list #3 with which the mobile station is registered by location registration processing, i.e. when detecting that the mobile station #b has moved out of the pool area #2 including the TA list #3 with which the mobile station is registered by location registration processing.

Note that, as shown in FIG. 3, in the mobile communication system according to this embodiment, the TA lists (location registration areas) set for the mobile station #a belonging to the first layer and the TA lists (location registration areas) set for the mobile station #b belonging to the second layer are configured to be different.

However, all of the TA lists set for the mobile station #a belonging to the first layer and all of the TA lists set for the mobile station #b belonging to the second layer do not always have to be configured to be different.

Moreover, in the mobile communication system according to this embodiment, the pool areas set for the mobile station #a belonging to the first layer and the pool areas set for the mobile station #b belonging to the second layer are configured to be different.

However, all of the pool areas set for the mobile station #a belonging to the first layer and all of the pool areas set for the mobile station #b belonging to the second layer do not always have to be configured to be different.

Furthermore, in the mobile communication system according to this embodiment, adjacent pool areas may be configured to overlap with each other or may be configured not to overlap with each other.

Figures 4, 5, 6:
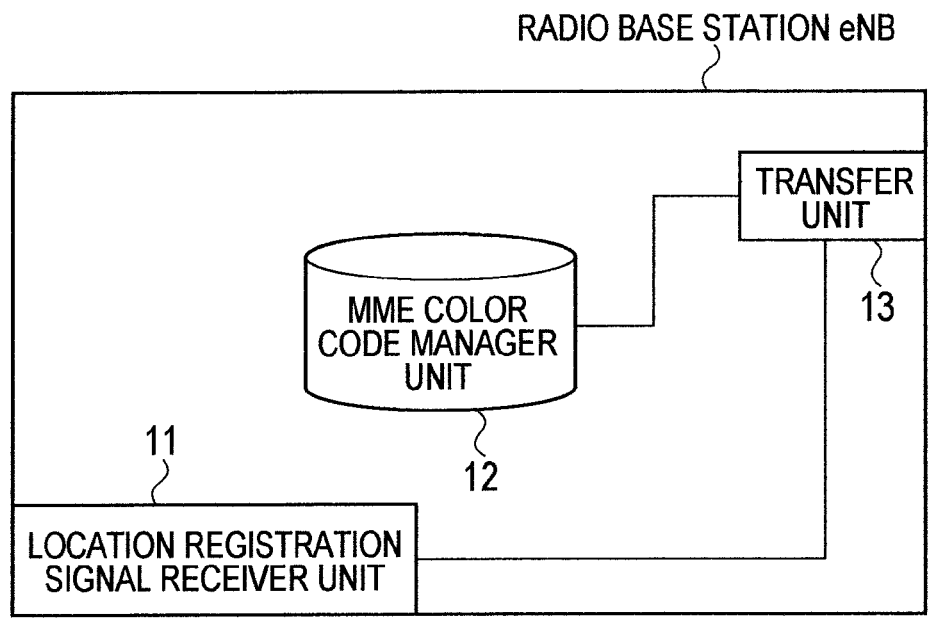
FIG. 4 is a functional block diagram of a radio base station according to the first embodiment of the present invention.
FIG. 5 is a diagram illustrating a configuration of an S-TMSI provided in a location registration signal received by a location registration signal receiver unit in the radio base station according to the first embodiment of the present invention.
FIG. 6 is a diagram showing an example of a correspondence relationship between "transfer destination exchange" and "MME color code", which is managed by an MME color code manager unit in the radio base station according to the first embodiment of the present invention.

As shown in FIG. 4, the radio base station eNB according to this embodiment includes a location registration signal receiver unit 11, an MME color code manager unit 12 and a transfer unit 13.

The location registration signal receiver unit 11 is configured to receive a NAS (Non-Access Stratum) signal that is a signal between a mobile station UE and the exchange MME, such as a TAU signal (location registration signal) transmitted by the mobile station UE.

The NAS signal includes an S-TMSI (S-Temporary Mobile Subscriber Identity).

As shown in FIG. 5, the S-TMSI consists of an MME color code and an M-TMSI. Here, the M-TMSI is a unique mobile station ID within each exchange MME, and is used to identify the mobile station in paging or NAS signaling.

The MME color code manager unit 12 is configured to manage an "MME color code" and a "transfer destination MME" in a manner associated to each other as shown in FIG. 6. The "transfer destination MME" indicates a transfer destination exchange MME of a NAS signal (e.g. TAU signal).

In the example of FIG. 6, "#0" and "#2" are MME color codes assigned to the mobile station #a belonging to the first layer, and "#1" and "#3" are MME color codes assigned to the mobile station #b belonging to the second layer.

In other words, the MME color code (exchange ID) assigned to the mobile station #a belonging to the first layer and the MME color code (exchange ID) assigned to the mobile station #b belonging to the second layer are configured to be different although both of the MME color codes (exchange IDs) identify the same exchange MME.

The transfer unit 13 is configured to transfer the received NAS signal (e.g. TAU signal) to the exchange MME identified by the MME color code (exchange ID) included in the NAS signal (e.g. TAU signal) (i.e., to the transfer destination exchange MME associated with the MME color code (exchange ID) included in the received NAS signal (e.g. TAU signal)).

Note that when the exchange MME cannot be identified by the MME color code (exchange ID) included in the received NAS signal (e.g. TAU signal), the transfer unit 13 is configured to transfer the NAS signal (e.g. TAU signal) to a predetermined exchange MME.

(Operations of Mobile Communication System according to First Embodiment of the Invention)

With reference to FIGS. 7 to 12, a description is given of operations of the mobile communication system according to the first embodiment.

Figure 7:
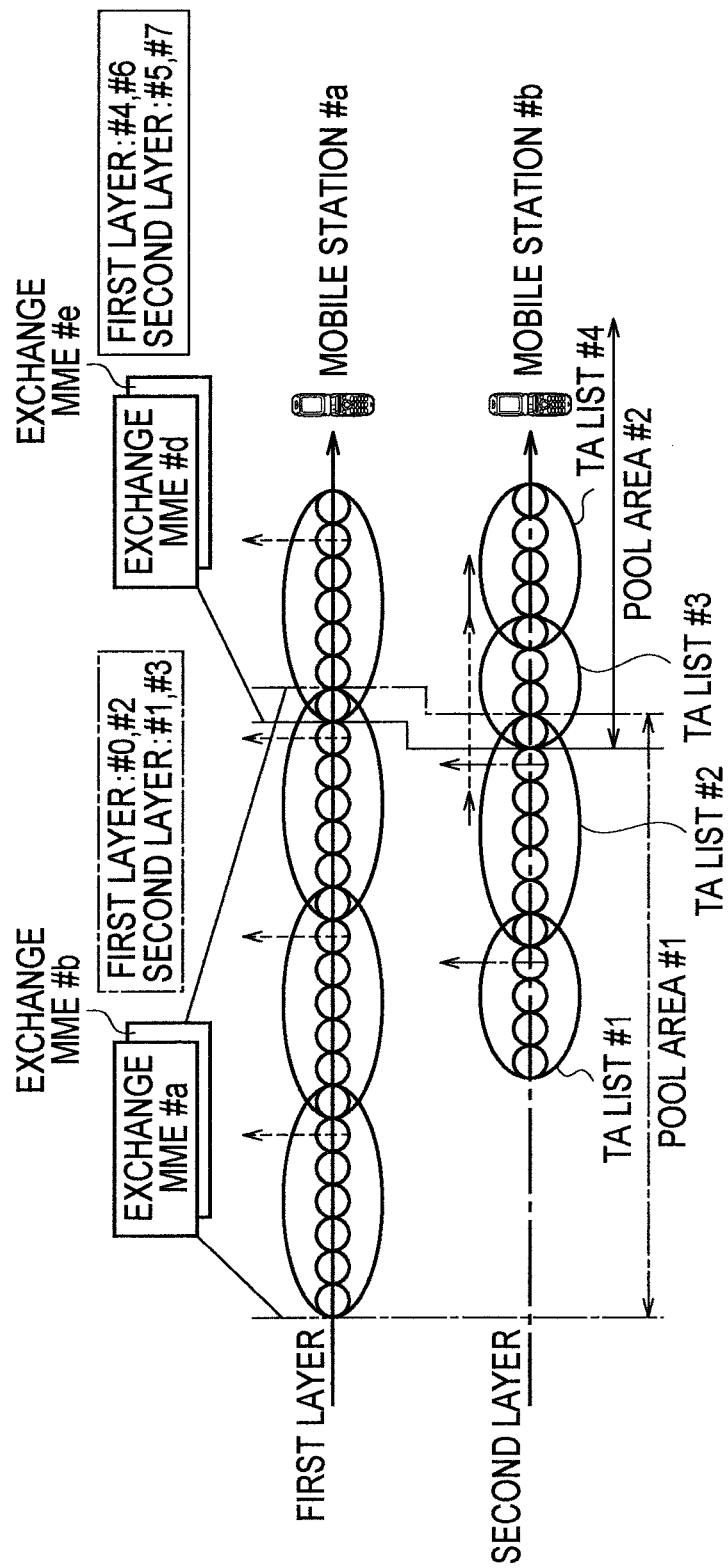
FIG. 7 is a diagram illustrating an operation of the mobile communication system according to the first embodiment of the present invention.
Figure 8:
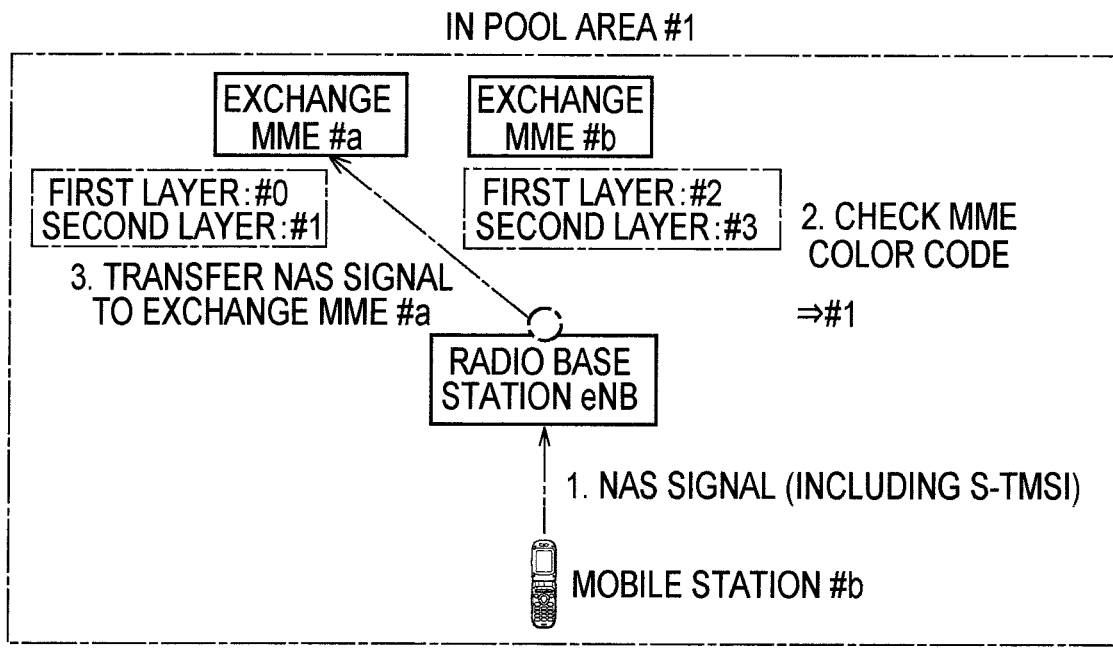
FIG. 8 is a diagram illustrating the operation of the mobile communication system according to the first embodiment of the present invention.
Figure 9:
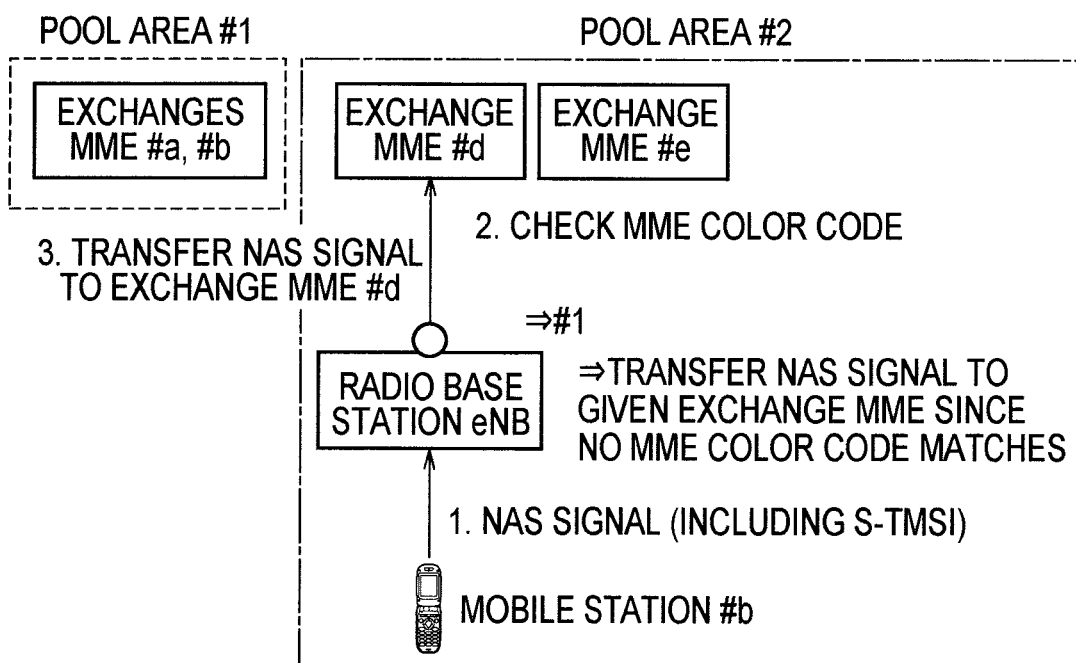
FIG. 9 is a diagram illustrating the operation of the mobile communication system according to the first embodiment of the present invention.

First, with reference to FIGS. 7 to 9, a description is given of a first operation of the mobile communication system according to this embodiment.

To be more specific, as shown in FIG. 7, a description is given of an operation in which the mobile station #b belonging to the second layer is turned off after transmitting a NAS signal (e.g. TAU signal) in a TA list #1 within a pool area #1, and is turned back on after moving to a TA list #4 within a pool area #2.

Here, it is assumed that the radio base station eNB managing TAs in the TA list #1 manages an MME color code "#0" as an MME color code for identifying an exchange MME #a for the mobile station #a belonging to the first layer, and an MME color code "#1" as an MME color code for identifying the exchange MME #a for the mobile station #b belonging to the second layer.

It is also assumed that the radio base station eNB managing TAs in the TA list #1 manages an MME color code "#2" as an MME color code for identifying an exchange MME #b for the mobile station #a belonging to the first layer, and an MME color code "#3" as an MME color code for identifying the exchange MME #b for the mobile station #b belonging to the second layer.

As shown in FIG. 8, in Step 1, the mobile station #b belonging to the second layer transmits a NAS signal (e.g. TAU signal) to the radio base station eNB within the TA list #1.

In Step 2, the radio base station eNB checks an MME color code included in the NAS signal (e.g. TAU signal). Here, the radio base station eNB extracts an MME color code "#1", since the mobile station #b belonging to the second layer is already registered with the TA list #1 in the pool area #1 by the location registration processing.

In Step 3, the radio base station eNB transfers the NAS signal (e.g. TAU signal) to the exchange MME #a identified by the MME color code "#1".

As shown in FIG. 9, in Step 1, the mobile station #b belonging to the second layer, which has been turned back on in the TA list #4, transmits a NAS signal (e.g. TAU signal) to the radio base station eNB managing TAs in the TA list #4. Here, the radio base station eNB extracts the MME color code "#1" since the mobile station #b belonging to the second layer is still registered with the TA list #1 in the pool area #1 by the location registration processing.

In Step 3, since no exchange MME can be identified by the MME color code "#1", the radio base station eNB transfers the NAS signal (e.g. TAU signal) to a predetermined exchange (i.e., exchange which controls a pool area #2 including the TA list #4) MME #d or MME #e (exchange MME #d in the example of FIG. 9).

Figure 10:
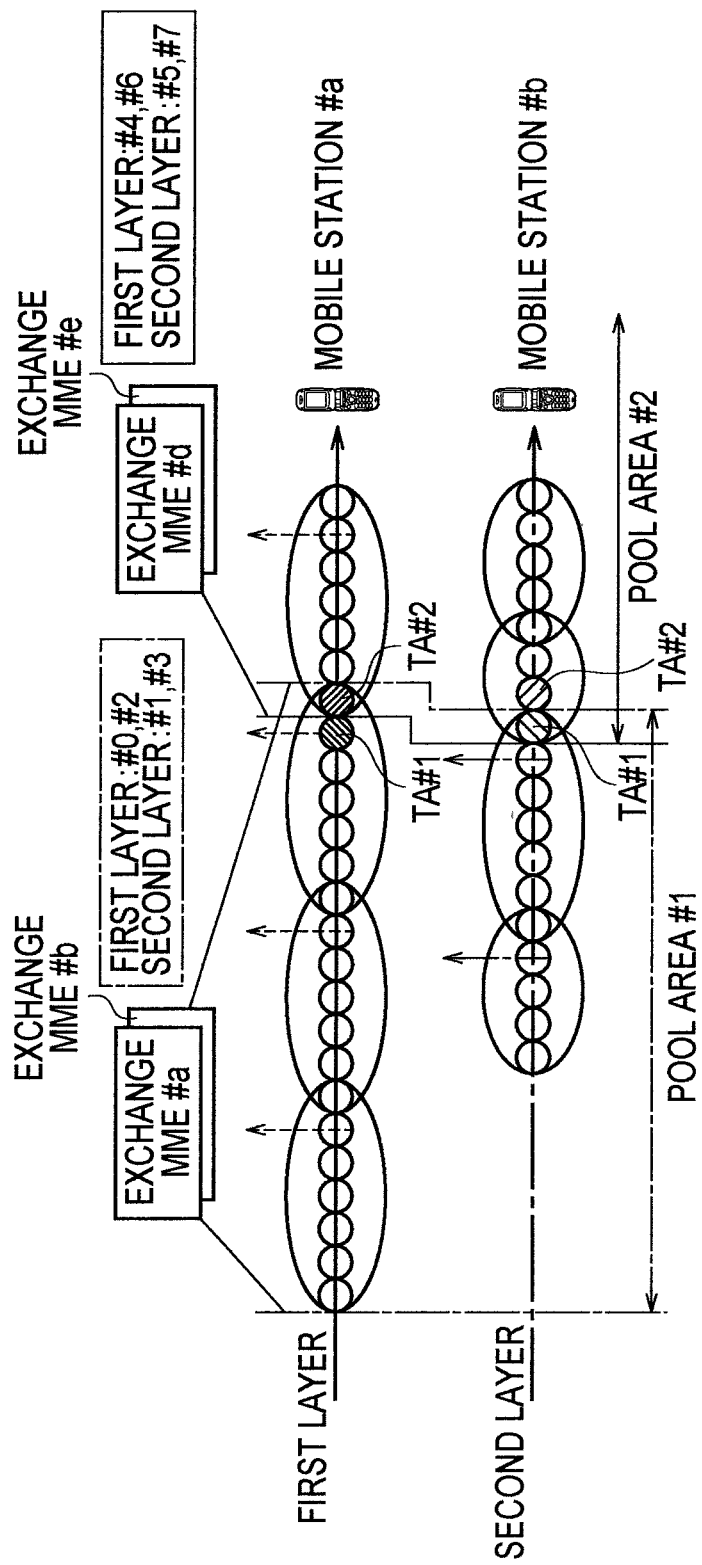
FIG. 10 is a diagram illustrating an operation of the mobile communication system according to the first embodiment of the present invention.
Figure 11:
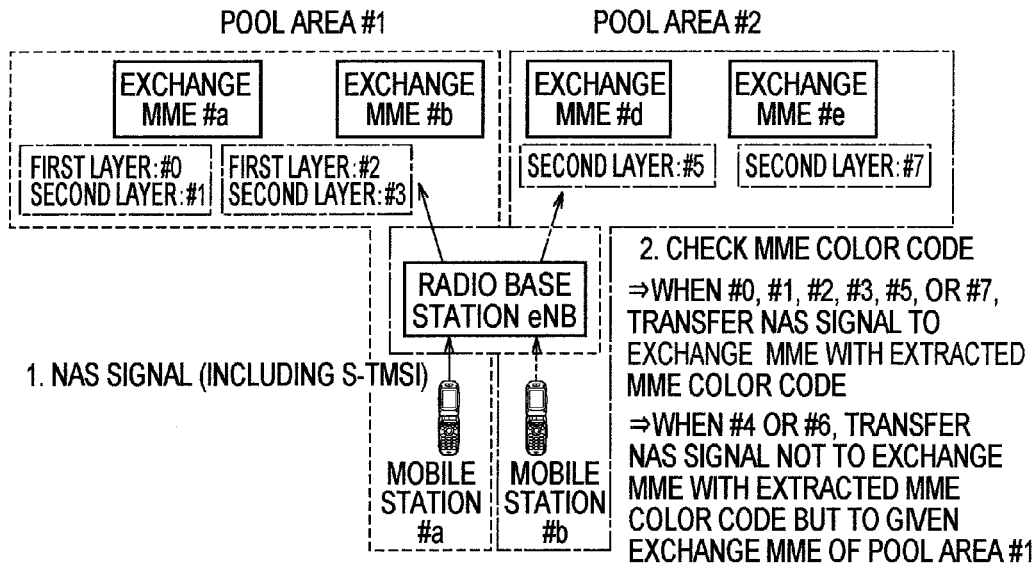
FIG. 11 is a diagram illustrating the operation of the mobile communication system according to the first embodiment of the present invention.
Figure 12:
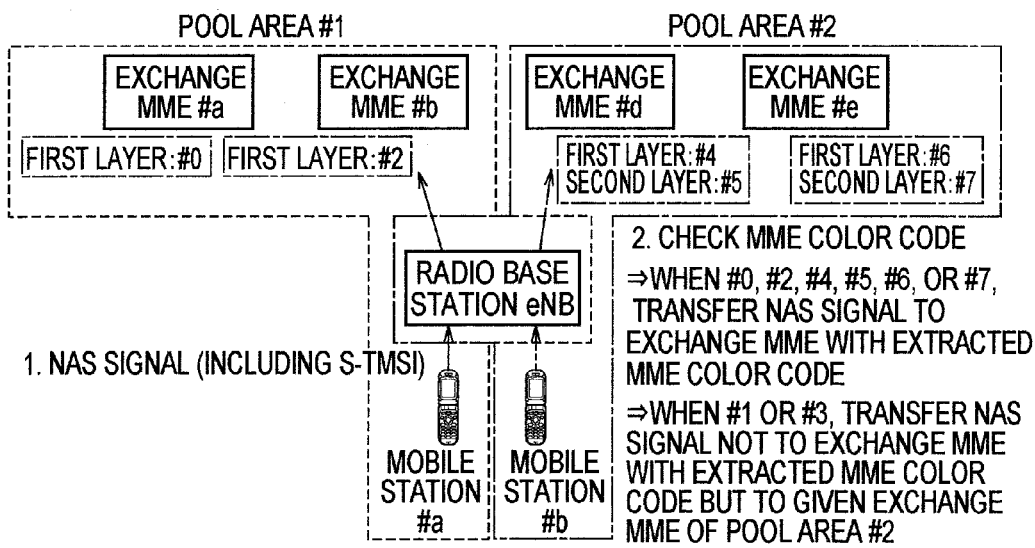
FIG. 12 is a diagram illustrating the operation of the mobile communication system according to the first embodiment of the present invention.

Secondly, with reference to FIGS. 10 to 12, a description is given of a second operation of the mobile communication system according to this embodiment.

To be more specific, as shown in FIG. 10, a description is given of an operation in which the mobile station #a belonging to the first layer and the mobile station #b belonging to the second layer transmit NAS signals (e.g. TAU signals) in a TA #1 and a TA #2.

Here, it is assumed that the TA #1 is included in the pool area #1 set for the mobile station #a belonging to the first layer and in the pool areas #1 and #2 set for the mobile station #b belonging to the second layer.

It is also assumed that the TA #2 is included in the pool areas #1 and #2 set for the mobile station #a belonging to the first layer and in the pool area #2 set for the mobile station #b belonging to the second layer.

As shown in FIG. 11, in Step 1, the mobile station #a belonging to the first layer and the mobile station #b belonging to the second layer transmit in the TA #1 NAS signals (e.g. TAU signals) to a radio base station eNB managing the TA #1.

Here, it is assumed that the radio base station eNB manages an MME color code "#0" as an MME color code for identifying an exchange MME #a for the mobile station #a belonging to the first layer, and an MME color code "#1" as an MME color code for identifying the exchange MME #a for the mobile station #b belonging to the second layer.

It is also assumed that the radio base station eNB manages an MME color code "#2" as an MME color code for identifying an exchange MME #b for the mobile station #a belonging to the first layer, and an MME color code "#3" as an MME color code for identifying the exchange MME #b for the mobile station #b belonging to the second layer.

It is further assumed that the radio base station eNB manages an MME color code "#5" as an MME color code for identifying an exchange MME #d for the mobile station #b belonging to the second layer.

It is still further assumed that the radio base station eNB manages an MME color code "#7" as an MME color code for identifying an exchange MME #e for the mobile station #b belonging to the second layer.

In Step 2, the radio base station eNB checks an MME color code included in the NAS signal (e.g. TAU signal).

Here, when the MME color code "#0" or "#1" has been extracted, the radio base station eNB transfers the NAS signal (e.g. TAU signal) to the exchange MME #a identified by the MME color codes "#0" and "#1".

When the MME color code "#2" or "#3" has been extracted, the radio base station eNB transfers the NAS signal (e.g. TAU signal) to the exchange MME #b identified by the MME color codes "#2" and "#3".

When a MME color code "#4" has been extracted, since no exchange MME can be identified by the MME color code "#4", the radio base station eNB transfers the NAS signal (e.g. TAU signal) to a predetermined exchange (i.e., exchange which controls the pool area #1 including the TA #1) MME #a or MME #b.

When the MME color code "#5" has been extracted, the radio base station eNB transfers the NAS signal (e.g. TAU signal) to the exchange MME #d identified by the MME color code "#5".

When a MME color code "#6" has been extracted, since no exchange MME can be identified by the MME color code "#6", the radio base station eNB transfers the NAS signal (e.g. TAU signal) to a predetermined exchange (i.e., exchange which controls the pool area #1 including the TA #1) MME #a or MME #b.

When the MME color code "#7" has been extracted, the radio base station eNB transfers the NAS signal (e.g. TAU signal) to the exchange MME #e identified by the MME color code "#7".

As shown in FIG. 12, in Step 1, the mobile station #a belonging to the first layer and the mobile station #b belonging to the second layer transmit in the TA #2 NAS signals (e.g. TAU signals) to a radio base station eNB managing the TA #2.

Here, it is assumed that the radio base station eNB manages the MME color code "#0" as the MME color code for identifying the exchange MME #a for the mobile station #a belonging to the first layer.

It is also assumed that the radio base station eNB manages the MME color code "#2" as the MME color code for identifying the exchange MME #b for the mobile station #a belonging to the first layer.

It is further assumed that the radio base station eNB manages the MME color code "#4" as the MME color code for identifying the exchange MME #d for the mobile station #a belonging to the first layer, and the MME color code "#5" as the MME color code for identifying the exchange MME #d for the mobile station #b belonging to the second layer.

It is still further assumed that the radio base station eNB manages the MME color code "#6" as the MME color code for identifying the exchange MME #e for the mobile station #a belonging to the first layer, and the MME color code "#7" as the MME color code for identifying the exchange MME #e for the mobile station #b belonging to the second layer.

In Step 2, the radio base station eNB checks an MME color code included in the NAS signal (e.g. TAU signal).

Here, when the MME color code "#0" is extracted, the radio base station eNB transfers the NAS signal (e.g. TAU signal) to the exchange MME #a identified by the MME color code "#0".

When the MME color code "#2" is extracted, the radio base station eNB transfers the NAS signal (e.g. TAU signal) to the exchange MME #b identified by the MME color code "#2".

When the MME color code "#1" or "#3" is extracted, since no exchange MME can be identified by the MME color codes "#1" and "#3", the radio base station eNB transfers the NAS signal (e.g. TAU signal) to a predetermined exchange (i.e., exchange which controls the pool area #2 including the TA #2) MME #d or MME #e.

When the MME color code "#4" or "#5" is extracted, the radio base station eNB transfers the NAS signal (e.g. TAU signal) to the exchange MME #d identified by the MME color code "#4" or "#5".

When the MME color code "#6" or "#7" is extracted, the radio base station eNB transfers the NAS signal (e.g. TAU signal) to the exchange MME #e identified by the MME color code #6" or "#7".

(Advantageous Effects of Mobile Communication System according to First Embodiment of Present Invention)

The mobile communication system according to this embodiment enables different pool areas and TA lists to be set for the mobile stations #a and #b belonging to the respective layers. Thus, the mobile communication system according to this embodiment can avoid a situation such as a significant increase in location registration processing load at an exchange MME, even when the mobile stations #a and #b move at the same timing between the pool areas.

Moreover, according to the mobile communication system according to this embodiment, the radio base station eNB only needs to transfer a NAS signal (location registration signal) to an exchange MME identified by an MME color code. Thus, the mobile communication system according to this embodiment eliminates the need to consider the layer to which the mobile station that has transmitted the NAS signal belongs.

Furthermore, the mobile communication system according to this embodiment eliminates the need to assign an M-TMSI to each mobile station in consideration of the layer to which each mobile station belongs.

MODIFIED EXAMPLE 1

Figure 13:
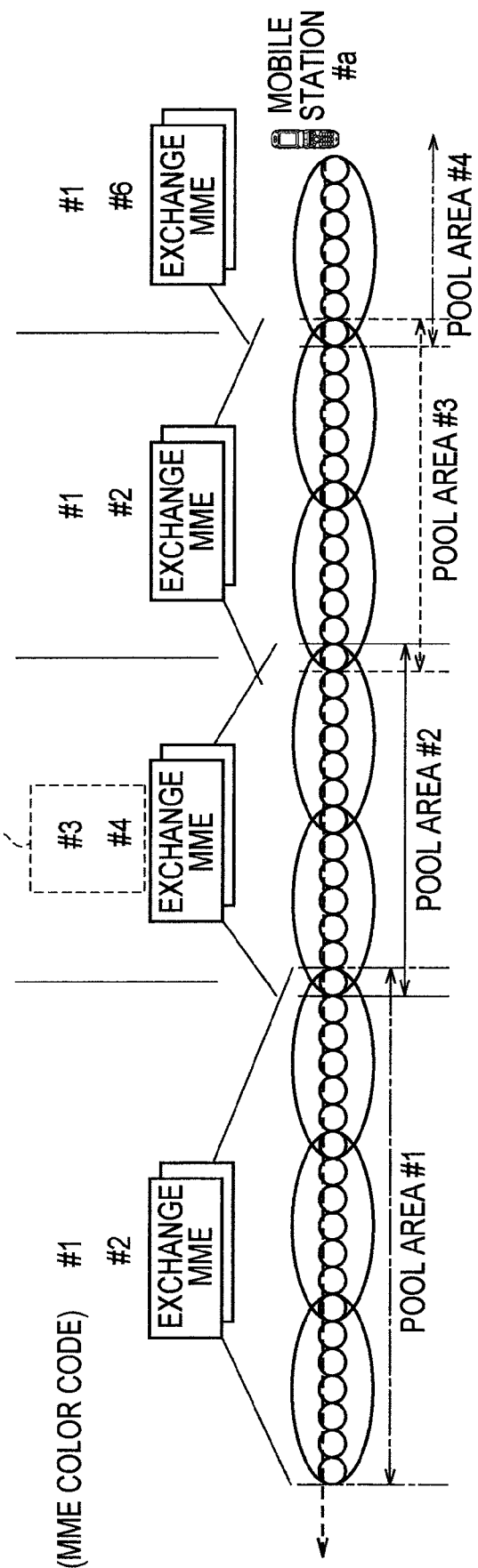
FIG. 13 is a diagram illustrating a mobile communication system according to Modified Example 1 of the present invention.

In a mobile communication system according to Modified Example 1 of the present invention, as shown in FIG. 13, an MME color code (exchange ID) is for uniquely identifying an exchange MME only in each pool area.

Therefore, in the mobile communication system according to this modified example, as shown in FIG. 13, the same exchange ID is configured not to be used between adjacent pool areas.

According to the mobile communication system according to this modified example, the MME color codes only need to be prepared such that the number of MME color codes is enough to uniquely identify the exchange MME only in each pool area. Thus, the mobile communication system according to this modified example can reduce the number of bits required for the MME color code.

Note that operation of the above described mobile station UE, the radio base station eNB and the exchange MME may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the radio base station eNB and the exchange MME. Also, the storage medium and the processor may be provided in the mobile station UE, the radio base station eNB and the exchange MME as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

It is to be noted that the entire contents of Japanese Patent Application No. 2008-025610 (filed on Feb. 5, 2008) is incorporated into the description of the present application.

INDUSTRIAL APPLICABILITY

As described above, the present invention can provide a location registration method, a mobile communication system and a radio base station, which are capable of avoiding a situation such as a significant increase in location registration processing load at an exchange MME, even when mobile stations move between pool areas.

The invention claimed is:

1. A location registration method of performing location registration processing on the basis of a location registration signal transmitted by a mobile station, the location registration method comprising the steps of:
transmitting, at the mobile station, the location registration signal, when detecting that the mobile station has moved out of a location registration area with which the mobile station is already registered by location registration processing; and
transferring, from a radio base station to an exchange identified by an exchange ID included in the location registration signal, the received location registration signal; wherein
an exchange ID assigned to a first mobile station is different from an exchange ID assigned to a second mobile station, even though the same exchange is identified by the exchange IDs;
a location registration area set for the first mobile station is different from a location registration area set for the second mobile station;
a pool area controlled by one exchange is formed to include one or more entire location registration areas;
a pool area set for the first mobile station is different from a pool area set for the second mobile station; and
adjacent pool areas are overlapped with each other.

2. The location registration method according to claim 1, wherein
when the radio base station fails to identify the exchange by the exchange ID included in the received location registration signal, the radio base station transfers the location registration signal to a predetermined exchange.

3. The location registration method according to claim 1, wherein the exchange ID is for uniquely identifying the exchange only in each pool area; and
the same exchange ID is not used in each two adjacent pool areas.

4. A mobile communication system configured to perform location registration processing on the basis of a location registration signal transmitted by a mobile station, wherein
the mobile station is configured to transmit the location registration signal, when detecting that the mobile station has moved out of a location registration area with which the mobile station is already registered by location registration processing;
a radio base station is configured to transfer the received location registration signal to an exchange identified by an exchange ID included in the location registration signal;
an exchange ID assigned to a first mobile station and an exchange ID assigned to a second mobile station are different from each other, even though the same exchange is identified by the exchange IDs;
a location registration area set for the first mobile station and a location registration area set for the second mobile station are different from each other;
a pool area controlled by one exchange is formed to include one or more entire location registration areas;
a pool area set for the first mobile station and a pool area set for the second mobile station are different from each other; and
adjacent pool areas are overlapped with each other.

5. The mobile communication system according to claim 4, wherein
when the radio base station fails to identify the exchange by the exchange ID included in the received location registration signal, the radio base station is configured to transfer the location registration signal to a predetermined exchange.

6. A radio base station used in the mobile communication system according to claim 5.

7. The mobile communication system according to claim 4, wherein the exchange ID is for uniquely identifying the exchange only in each pool area; and the same exchange ID is not used in each two adjacent pool areas.

8. A radio base station used in the mobile communication system according to claim 7.

9. A radio base station used in the mobile communication system according to claim 4.

* * * * *